(12) United States Patent
Nguyen

(10) Patent No.: US 11,231,078 B2
(45) Date of Patent: Jan. 25, 2022

(54) METHOD AND APPARATUS FOR MAGNETO-RHEOLOGICAL BRAKE SYSTEMS

(71) Applicant: Hung Quoc Nguyen, Ho Chi Minh (VN)

(72) Inventor: Hung Quoc Nguyen, Ho Chi Minh (VN)

(73) Assignee: Ton Duc Thang University, Ho Chi Minh (VN)

( * ) Notice: Subject to any disclaimer, the term of this patent is extended or adjusted under 35 U.S.C. 154(b) by 0 days.

(21) Appl. No.: 14/828,420

(22) Filed: Aug. 17, 2015

(65) Prior Publication Data

US 2021/0190155 A1 Jun. 24, 2021

(51) Int. Cl.
*F16D 57/00* (2006.01)
*F16D 121/20* (2012.01)

(52) U.S. Cl.
CPC ........ *F16D 57/002* (2013.01); *F16D 2121/20* (2013.01)

(58) Field of Classification Search
CPC .......................... F16D 57/002; F16D 2121/20

USPC ............................................... 188/267.2, 161
See application file for complete search history.

(56) References Cited

U.S. PATENT DOCUMENTS

| | | | | |
|---|---|---|---|---|
| 2,488,827 A * | 11/1949 | Pensabene | ............. | H02K 49/06 310/105 |
| 5,598,908 A * | 2/1997 | York | ...................... | F16D 37/02 188/267 |
| 6,186,290 B1 * | 2/2001 | Carlson | ................. | F16D 57/002 188/161 |
| 6,702,221 B2 * | 3/2004 | Haber | .................... | B65H 59/04 188/267.2 |
| 6,854,573 B2 * | 2/2005 | Jolly | ..................... | F16D 57/002 188/161 |
| 2011/0114421 A1 * | 5/2011 | Piech | ....................... | B66B 1/32 187/276 |

* cited by examiner

*Primary Examiner* — Melanie Torres Williams

(57) ABSTRACT

A method and apparatus for an automobile's magneto-rheological brake (MRB) are disclosed which include: a shaft connected to a stationary housing, a magneto-rheological fluid chamber positioned inside the stationary housing, a rotary disc connected to and rotate with the shaft, a plurality of magnetic coils wound directly onto a lateral side of the MRB chamber.

20 Claims, 11 Drawing Sheets

METHOD AND APPARATUS FOR MAGNETO-RHEOLOGICAL BRAKE SYSTEMS

FIELD OF THE INVENTION

The present invention relates generally to the field of braking systems. More specifically, the present invention relates to magneto-rheological braking systems.

BACKGROUND ART

In recent years, magneto-rheological fluid brakes (MRB) have been introduced into the automobile industry. In MRBs, exposure to magnetic field causes a change in rheology, i.e., the particles within the magneto-rheological fluid which become polarized and align into chains. This rheological change causes an increase in torsional resistance between the housing and the rotor. This provides the controllable resistance in any device where the magneto-rheological brake is used. The objective of the MRBs is to obtain maximum braking torque at a lowest possible mass, capable of smoothly bringing a speeding car to a complete stop without sending the car to a fatal skid or spin.

In order to achieve the above objective, different types of MRBs have been tried and evaluated such as disc-type MRBs, drum-type MRBs, hybrid-type MRBs (a combination of disc-type and drum type MRBs) with T-shaped rotor MRBs. The results showed that the mass of the conventional MRBs are heavy in comparison to the braking torques.

Referring now to FIG. 1, a planar view of a prior art magneto-rheological brake (MRB) 100 is illustrated which includes a stationary housing 110, a shaft 120, a rotor 130, a magneto-rheological (MR) chamber 140, magnetic coil 150, and sealants 170. In the prior art MRB 100, rotor 130 made of magnetic steel is fastened to shaft 120 made of non-magnetic steel. Rotor 130 is enclosed inside stationary housing 110 which is made of magnetic steel. Each magnetic coil 150 is comprised of wires wound on a non-magnetic bobbin which is fixed to stationary housing 110. In the prior art MRB 100, magnetic coil 150 is positioned on top of magneto-rheological chamber 140 and above rotor 130. Magneto-rheological chamber 140 is filled with magneto-rheological fluid. In order to prevent the leaking of the magneto-rheological fluid, sealants 170 are employed. As the power of magnetic coil 150 is turned on, a magnetic field is generated inside stationary housing 110, and the magneto-rheological fluid in MR chamber 140 changes phase and becomes solid. This results in a controllable friction from the solidified MR fluid to rotor 130 to slow down and stop shaft 120.

FIG. 1B shows the magnetic distribution of the prior-art rectangular MRB 100. As shown in FIG. 1B, the magnetic distribution in stationary housing 110 is very non-uniform. The magnetic density near magnetic coil 150 almost reaches to the magnetic saturation of the housing material (1.146) while that near rotatable shaft 130 is very small (0.32 to 0.36). This will cause inefficient braking.

Continuing with the discussion of FIG. 1A-FIG. 1B, this prior art configuration results in many disadvantages. One of such disadvantages is the "bottle-neck" problem of magnetic flux 160 that diminishes the braking torques of MRB 100. Furthermore, as mentioned above, a nonmagnetic bobbin is required for each magnetic coil 150. Thus, prior art MRB 100 requires high manufacturing costs, difficulties in maintenance, and ineffective braking torque per unit mass.

Therefore what is needed is a MRB that can overcome the above described problems.

SUMMARY OF THE INVENTION

Accordingly, an object of the present invention is to provide braking assembly that provides solutions to the problems described above. Thus, a method and apparatus for a magneto-rheological brake (MRB) are disclosed which include: a shaft connected through a stationary housing, a magneto-rheological fluid chamber enclosed inside the stationary housing, rotor is fastened to and rotatable with the shaft, a plurality of magnetic coils wound directly onto the lateral walls of a magneto-rheological fluid chamber.

These advantages of the proposed MRBs of the present invention over the conventional MRB 100 can be listed in detail as followings:

A nonmagnetic gasket can be used at the contact of the two housing parts, which eliminates the leaking of MRF at this place.

The coils can be wound directly to the housing without a bobbin.

The magnetic circuit of the MRB of the present invention can be tested and measured without assembling two housing parts together.

The disc thickness of the MRB of the present invention is generally greater than that of the conventional one. This makes it easier to fix the disc on the hub of the shaft, especially in case of miniature MRBs.

It is easier for maintenance of sealing and bearing systems of the MRB without damaging the coils.

It is easier for rewinding the coils of the proposed MRB of the present invention because there is no bobbin and the coils can be easily to take out of the housing.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Different Configurations of the MRBs of the Present Invention

Figure 2:
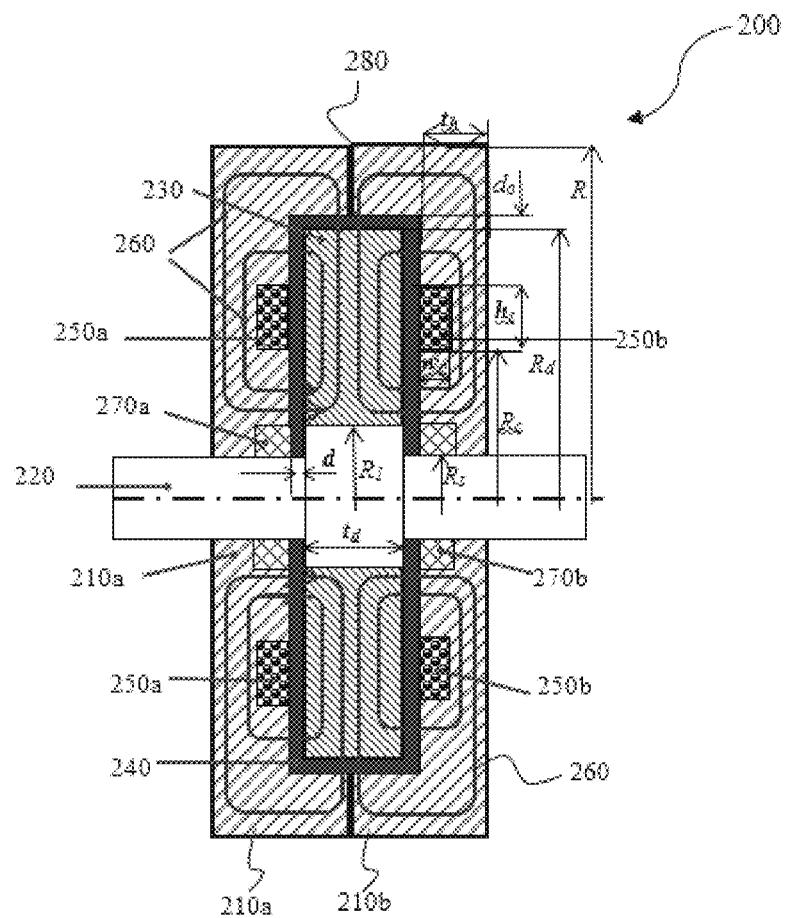
FIG. 2 is a diagram illustrating a planar view of a disc-type magneto-rheological brake (MRB) having a first magnetic coil and a second magnetic coil wound on the lateral walls of the stationary housing in accordance with an embodiment of the present invention.

Referring now to FIG. 2, a planar diagram of a disc-type magneto-rheological brake (hereinafter referred to as "MRB") 200 in accordance with an embodiment of the present invention is illustrated. In one embodiment, disc-type MRB 200 includes a stationary housing 210a-210b, a rotatable shaft 220, a rotor 230, a magneto-rheological chamber 240, a first magnetic coil 250a, a second magnetic coil 250b, and sealants 270. In disc-type MRB 200, rotor 230 is fastened to rotatable shaft 220 and enclosed inside stationary housing 210a-210b. In this embodiment, first magnetic coil 250a and second magnetic coil 250b are wound directly on the lateral sides of stationary housing 210a-210b without the need of bobbins. In contrast to prior art MRB 100 described above where the magnetic coil 150 is wound on top of MR chamber 140, in one embodiment of the present invention, first magnetic coil 250a and second magnetic coil 250b are positioned on the lateral sides, around the periphery of magneto-rheological chamber 240 inside stationary housing 210a-210b. Consequently, this embodiment of the present invention reduces manufacturing costs and complexities for MRB 200. Stationary housing 210a-210b includes to a left housing segment 210a and a right housing segment 210b. Magneto rheological chamber 240 is a hollow space created by assembling left housing segment 210a and right housing segment 210b together. Magneto-rheological chamber 240 is filled with magneto-rheological fluid. In order to prevent the leaking of the magneto-rheological fluid, sealants 270 such as radial lip seals are employed. In one embodiment, MRB 200 also includes a controller (not shown) and a current amplifier (not shown). The current amplifier and the controller (not shown) are designed to control the power delivered to first magnetic coil 250a and second magnetic coil 250b. As first magnetic coil 250a and second magnetic coil 250b are turned on, a magnetic field 260 is generated. As a result, magneto-rheological fluid in magneto rheological chamber 240 changes its phase and solidifies. This results in a controllable friction from the solidified MR fluid causing rotor 230 to slow down and eventually stop rotatable shaft 220.

Continuing with the detailed description of the disc-type MR brake 200 illustrated in FIG. 2, rotor 230 is connected to rotatable shaft 220. Left stationary housing segment 210a and right stationary segment housing 210b each has an opening that is lined up with one another so that rotatable shaft 220 can be inserted therethrough. Other cuts (not shown) directly above the openings are designed to deposit sealants 270. In addition, a first cut in the middle of the inner wall of left stationary housing segment 210a is formed in order to place first magnetic coil 250a thereon. Note that first magnetic coil 250a encircles rotatable shaft 220. Similarly, a second cut in the middle of the inner wall of right stationary housing segment 210b is formed in order to place second magnetic coil 250b thereon. Note that second magnetic coil 250b encircles rotatable shaft 230. Rotor 220 is inserted through the lined up openings of left stationary housing segment 210a and right stationary housing segment 210b. A second lip seal gasket 280 is used to seal left stationary housing segment 210a and right stationary housing segment 210b together in a manner that chamber 240 having a thickness d is formed between rotor 230 and the inner walls of left stationary housing segment 210a and right stationary housing segment 210b. Next, magneto-rheological fluid is injected into chamber 240.

Referring again to FIG. 2, a commercial silicon steel is used for magnetic components of the MR brake 200 of stationary housing 210a-210b and rotor 230. The wires of first magnetic coil 250a and second magnetic coils 250b are sized as 21-gage (diameter=0.511 mm) whose maximum working current is around 3 A and during the optimization process, a current of 2.5 A is applied to the coil. The commercial MR fluid, MRF132-DG, made by Lord Corporation is used in this embodiment. The magnetic properties of the components of MRB 200 are given in Table 1 below. The rheological parameters of the MRF132-DG dare specified by the following parameters: $\mu_0=0.1$ pa s; $\mu_\infty=3.8$ pa s; $\alpha_{s_\mu}=4.5$ $T^{-1}$; $\tau_{y0}=15$ pa; $\tau_{y\infty}=40000$ pa; $\alpha_{s_{t_y}}=2.9$ $T^{-1}$.

TABLE 2

Magnetic properties of the components of disc-type MRB 200:

| Material | Relative Permeability | Saturation Flux Density |
|---|---|---|
| Silicon Steel | B-H curve | 1.55 Tesla |
| Copper | 1 | |
| MRF132-DG | B-H curve | 1.65 Tesla |
| Nonmagnetic Steel | 1 | X |

Figure 3:
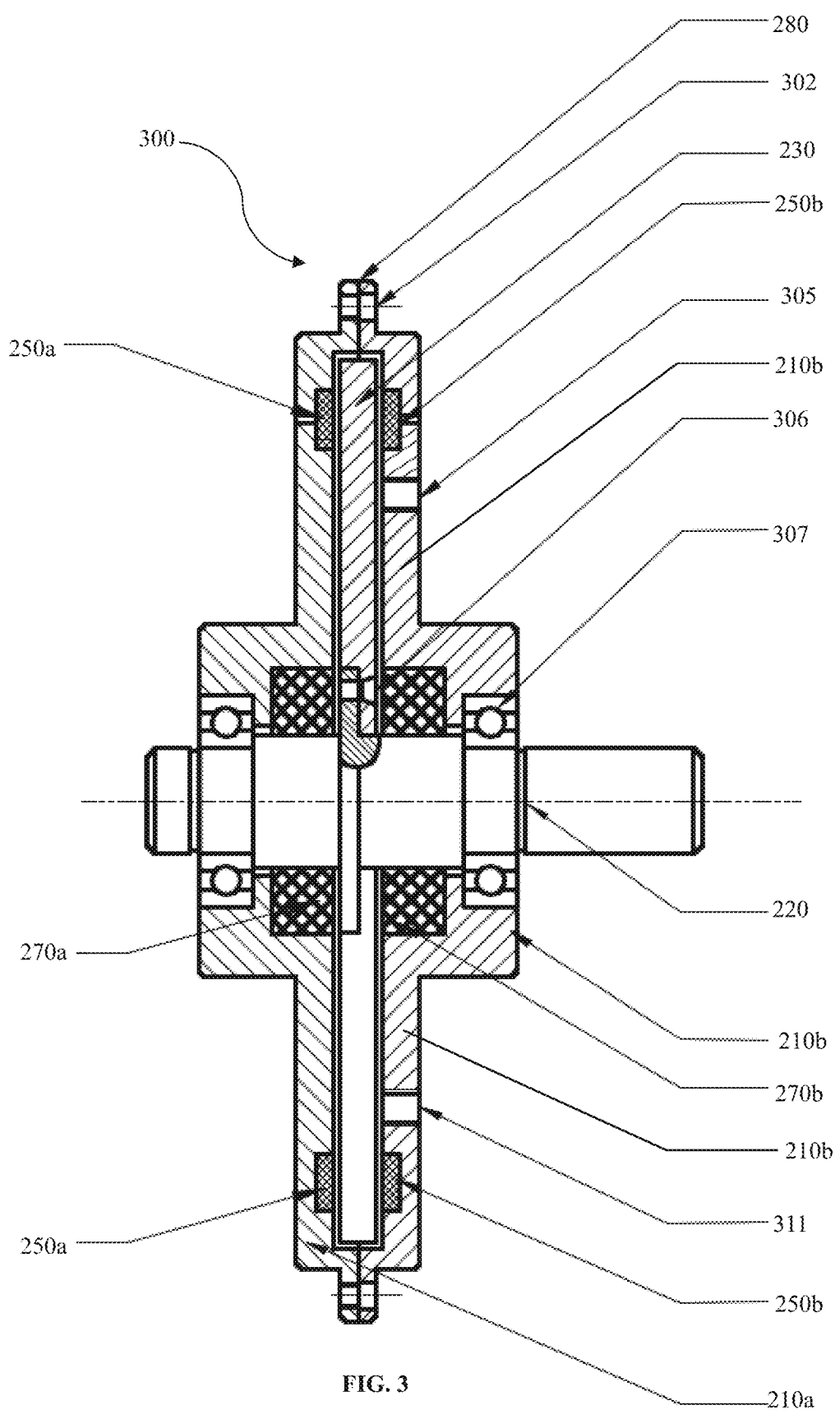
FIG. 3 is a diagram illustrating a planar view of a practical implementation of the disc-type MRB of FIG. 2 in accordance with an embodiment of the present invention.

Referring next to FIG. 3, a a planar view of a practical implementation of disc-type MRB 200 presented as a disc-type magneto-rheological brake (MRB) 300 is illustrated. In disc-type MRB 300, left stationary housing segment 210a and right stationary housing segment 210b are also fastened together by a housing bold 302. Furthermore, second lip seal gasket 280 are applied between left stationary housing segment 210a and right stationary housing segment 210b.

Continuing with FIG. 3, on the side of stationary housing 210a-210b, there are filling holes 305 where the magneto-rheological fluid is injected into chamber 240 that contains a magneto-rheological fluid. Filling screws 311 are used to close up filling holes 305. Rotatable shaft 220 is fastened to stationary housing 210 by bearings 307.

Still referring to FIG. 2 and FIG. 3, in operation, by assuming that magneto-rheological fluid behaves rheological as Bingham plastic fluids and by the assumption of a linear velocity profile in the in chamber 240 of disc-type MRB 200, the induced braking and the off-state force are determined as follows.

When no current is applied to first magnetic coil 250a and second magnetic coil 250b of disc-type MRB 200, torques are respectively determined by equations (1) and (2):

$$T_d = \frac{\pi \mu_e R_d^4}{d}\left[1 - \left(\frac{R_1}{R_d}\right)^4\right]\Omega + \frac{4\pi \tau_{ye}}{3}(R_d^3 - R_1^3) + 2\pi R_d^2 t_d\left(\tau_{ya} + \mu_a \frac{\Omega R_d}{d_o}\right) + 2T_{sf} \quad (1)$$

$$T_{d0} = \frac{\pi \mu_0 R_d^4}{d}\left[1 - \left(\frac{R_1}{R_d}\right)^4\right]\Omega + \frac{4\pi \tau_{y0}}{3}(R_d^3 - R_1^3) + 2\pi R_d^2 t_d\left(\tau_{y0} + \mu_0 \frac{\Omega R_d}{d_o}\right) + 2T_{sf} \quad (2)$$

where $R_1$ and $R_d$ are the inner and outer radius of rotor 230, d is the gap size of the end-face of chamber 240 between rotor 230 and stationary housing 210a-210b, $d_o$ is the gap size of chamber 240 at the outer cylindrical face of the rotor 230, $t_d$ is the thickness of the rotor 230, $\Omega$ is the angular velocity of rotor 230, $\mu_e$ and $\mu_a$ are respectively the average post yield viscosity of MR fluid in the in the end-face of chamber 240, $\tau_{ye}$ and $\tau_{ye}$ are respectively the average yield stress of MR fluid in the in the end-face chamber 240, $\tau_{y0}$ and $\mu_0$ are the zero-field yield stress and viscosity of the MRF, and $T_{sf}$ is the friction torque between rotatable shaft 220 of MR brake 200 and sealant 270. It is noted that the induced yield stress $\tau_{ye}$, $\tau_{ya}$, and the average post yield viscosity $\mu_e$, $\mu_a$ are fluid properties depending on the exerted magnetic flux density across chamber 240 and can be estimated by the following equation 3:

$$Y = Y_\infty + (Y_0 - Y_\infty)(2e^{-B\alpha_{SY}} - e^{-2B\alpha_{SY}}) \quad (3)$$

Y is a rheological parameters of MR fluid such as the yield stress ($\tau_{ye}$, $\tau_{ya}$) and the post yield viscosity ($\mu_e$, $\mu_a$). The value of Y tends from the zero-applied field value $Y_0$ to the saturation value $Y_\infty$, $\alpha_{SY}$ is the saturation moment index of the Y parameter. B is the applied magnetic density.

The friction torque $T_{sf}$ of second lip seal gasket 280 can be approximately calculated by equation 4:

$$T_{fs} = 0.65(2R_s)^2 \, RPM^{1/3} \quad (4)$$

In the equation 4, $T_{sf}$ is the friction torque of second lip seal gasket 280 in ounce-inches, RPM is the rotation speed of rotatable shaft 220 measured in rounds per minute, $R_s$ is the rotatable shaft diameter at the sealing measured in inches.

In one embodiment of the present invention, the dimensions of disc-type MRB 200 illustrated in FIG. 2 are $w_c$=6, $h_c$=2.75, $R_1$=7.1, $R_d$=50, $t_d$=4, R=60 and $t_h$=5.9. With these measurements, the braking torque can reach up to 10 Nm as constrained and the minimum mass is 1.4 kg. For disc-type MRB 200 of the present invention, the preferred dimensions in millimeters (mm) are: $w_c$=1.9, $h_c$=7.4, $R_1$=11, $R_d$=49, $t_d$=6.8, $R_6$=52, $R_1$=11, $t_h$=5.25 and $R_c$=37.5. Preferably, the number of coil turns is 140 turns for first magnetic coil 250a and second magnetic coil 250b and the measured resistance of each coil is 3Ω.

At the optimum, the braking torque is measured to be 10 kN as constrained and the minimum mass is 1.17 kg. The mass of disc-type MRB 200 of the present invention is significantly reduced as compared to that of the prior-art MRB 100.

Figure 4:
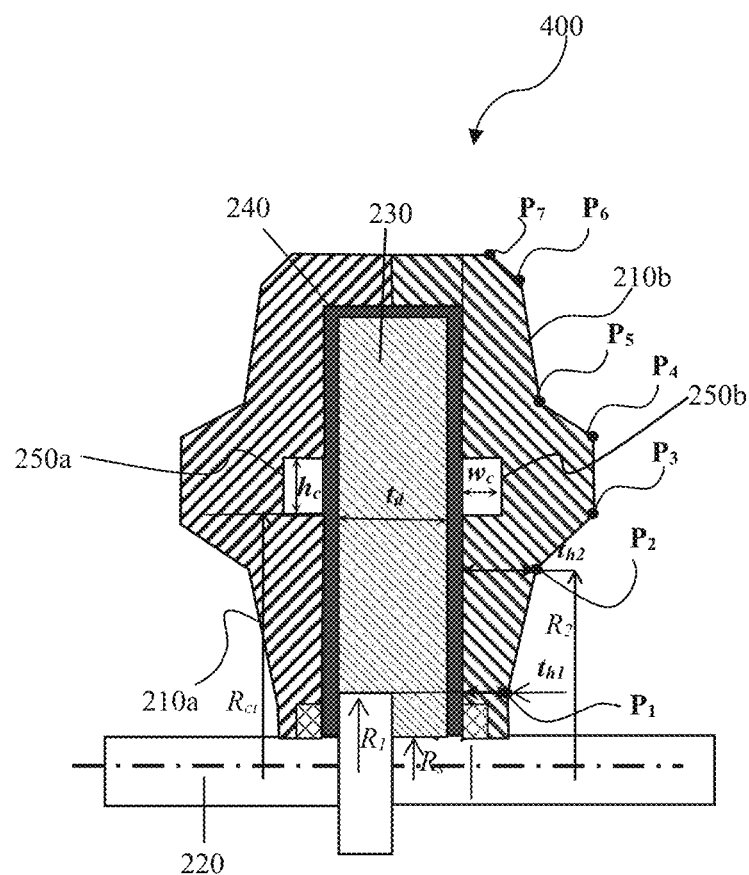
FIG. 4 is a diagram illustrating a planar view of a top half of a seven segmented polygonal (heptagon) MRB in accordance with an embodiment of the present invention.

Now referring to FIG. 4, a planar view of a seven-segmented polygonal (heptagon) MRB 400 in accordance one embodiment of the present invention is illustrated. The control point $P_i$ is determined by its radius $R_i$ and corresponding $t_{hi}$. In this embodiment, it is noted that in addition to the abovementioned variables, i.e., the coil height $h_c$, the coil width $w_c$, the disc radius $R_d$, the disc thickness $t_d$, the outer radius R of disc-type MRB 200 and the inner radius $R_c$ of first magnetic coil 250a and second magnetic coil 250b, the geometric parameters of the control point $P_i$ ($R_i$, $t_{hi}$) are also considered as a design variable. In this embodiment of the present invention, the braking torque can reach up to 10 Nm as constrained and the minimum mass is 1.08 kg and the values of design variables are (mm): $w_c$=6.9, $h_c$=2.5, $t_d$=4, $R_d$=44, $R_1$=10.5, $t_{h1}$=2, $R_2$=24.4, $t_{h2}$=2.4, $R_3$=34, $t_{h3}$=3.8, $R_4$=49.5, $t_{h4}$=5.8, $R_5$=52.4, $t_{h5}$=5.85, $R_6$=55.8, $t_{h6}$=4.25, $R(R_7)$=57.6, $t_{h7}$=2. In this embodiment, the braking torque is 10 Nm as constrained and the minimum mass is 0.96 kg. The values of design variables in millimeters (mm) are: $w_c$=3.8, $h_c$=4.3, $t_d$=7.5, $R_d$=44.5, $R_c$=36, $R_1$=13, $t_{h1}$=2, $R_2$=27.5, $t_{h2}$=2.6, $R_3$=34, $t_{h3}$=8, $R_4$=42, $t_{h4}$=7.7, $R_5$=43.5, $t_{h5}$=5.8, $R_6$=46.6, $t_{h6}$=1.1, $R(R_7)$=47.6, $t_{h7}$=0.3.

Continuing with FIG. 4, MRB 400 is defined by the thickness $t_{hi}$ and radius $R_i$ (where i=7). At the first index $P_1$, $t_{h1}$ is the thickness of the index $P_1$ measured from chamber 230. The distance from the center of rotor 220 to index $P_1$ is $R_1$. Similarly, $P_2$ has thickness $th_2$ and radius $R_2$; $P_3$ has thickness $th_3$ and radius $R_3$; $P_4$ has thickness $th_4$ and radius R4; $P_5$ has thickness $th_5$ and radius $R_5$; $P_6$ has thickness th6 and radius $R_6$; $P_7$ has thickness $th_7$ and radius $R_7$. First magnetic 250a and second magnetic coil 250b each has a width $W_c$, height $H_c$, and radius $R_c$. Rotor 220 has a radius $R_d$, and thickness td. Shaft 220 has a radius $R_s$. Finally, the gap between rotor 230 from the wall of chamber 240 is d. Preferably, the number of coil turns is 140 turns for first coil magnetic coil 250a and second magnetic coil 250b and the measured resistance of each coil is 3Ω.

The following Table 2 summarizes the preferred dimensions of MRB 400 that produces optimal braking torques at minimum weight:

TABLE 2

| MRB 400 Parameters | Coil: |
|---|---|
| | Width $w_c$ = 3.8; Height $h_c$ = 4.3 Radius $R_c$ = 36 |
| | Housing control points: |
| | $P_1$: $t_{h1}$ = 2, $R_1$ = 13; $P_2$: $t_{h2}$ = 2.6, $R_2$ = 27.5 |
| | $P_3$: $t_{h3}$ = 8, $R_3$ = 34; $P_4$: $t_{h4}$ = 7.7, $R_4$ = 42 |
| | $P_5$: $t_{h5}$ = 5.8, $R_5$ = 43.5; $P_6$: $t_{h6}$ = 1.1, $R_6$ = 46.6 |
| | $P_7$: $t_{h7}$ = 0.3, $R_7$ = 47.6 |
| | Disc: Radius $R_d$ = 44.5; Thickness $t_d$ = 7.5 |
| | MRF gap: d = 1 |
| | Shaft radius: $R_s$ = 6 |

Figure 5:
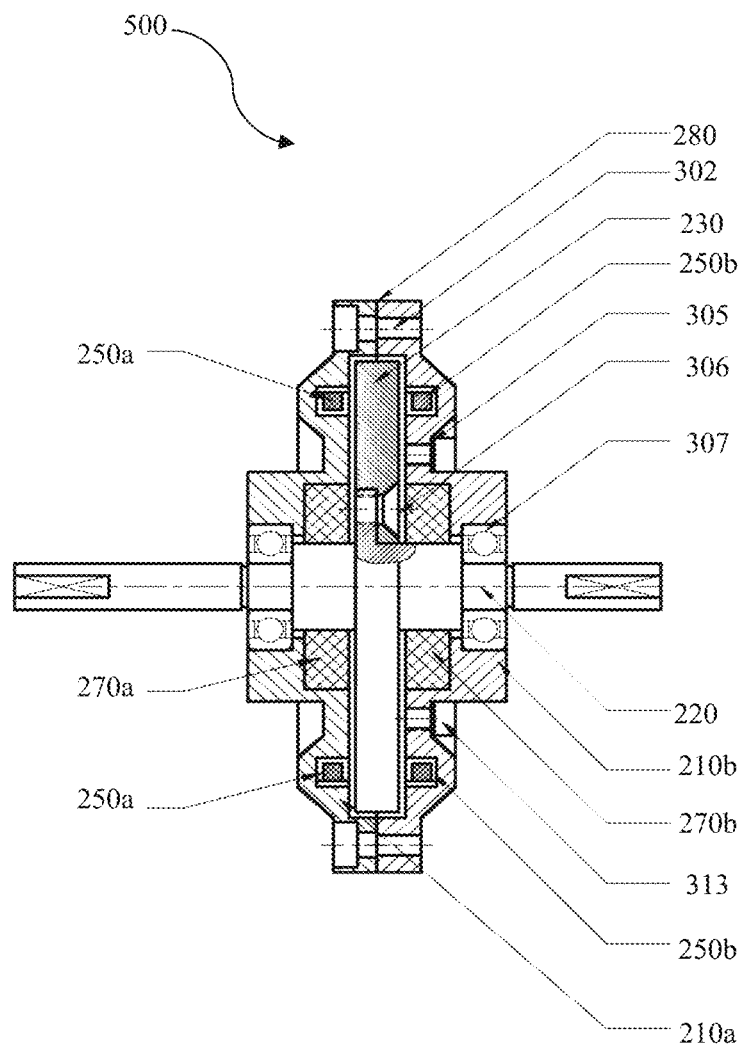
FIG. 5. is a diagram illustrating a planar view of an implementation of a complete seven segmented polygonal MRB in accordance with an embodiment of the present invention.

Now referring to FIG. 5, a planar diagram illustrating an actual implementation of polygonal shaped MRB 500 in accordance with an exemplary embodiment is illustrated. Similar to disc-type MRB 300, polygonal MRB 500 includes left stationary housing segment 210a and right stationary housing segment 210b are also fastened together by a housing bold 302. Furthermore, second lip seal gasket 280 are applied between left stationary housing segment 210a and right stationary housing segment 210b. On the side of stationary housing 210a-210b, there are filling holes 305 where the magneto-rheological fluid is injected into chamber 240 that contains a magneto-rheological fluid. Filling screws 311 are used to close up filling holes 305. Rotatable shaft 220 is fastened to stationary housing 210 by bearings 307.

Figure 6:
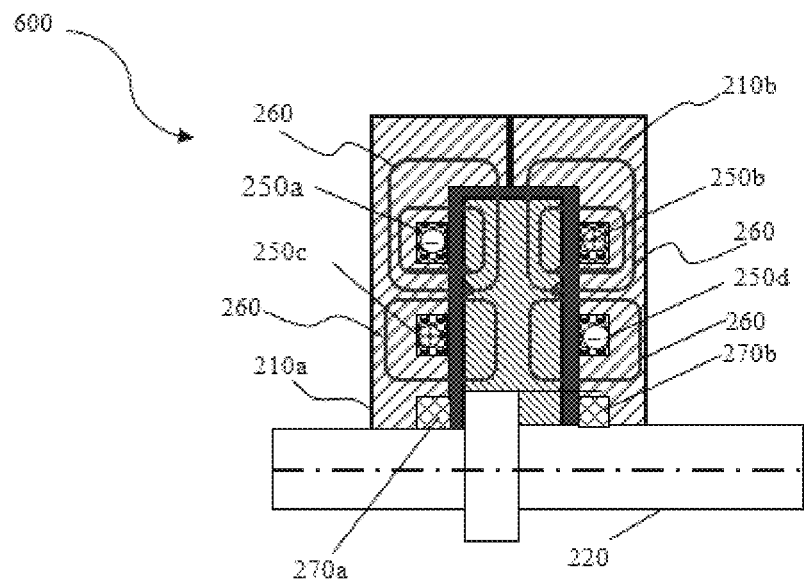
FIG. 6 is a diagram illustrating a planar view of a top half of a magneto-rheological brake (MRB) having at least two magnetic coils wound directly on the lateral walls of the stationary housing in accordance with an embodiment of the present invention.

Now referring to FIG. 6, a cross-section of a top half of disc-type MRB 600 in accordance to an exemplary embodiment of the present invention is illustrated. In order to increase the braking torque, more magnetic coils can be used. A third magnetic coil 250c is wound on left housing segment 210a in another recess location different from first recess. A fourth magnetic coil 250d is wound in the opposite direction and on the right housing segment 210b in a different recess location from second recess. As compared to MRB 300 above, magnetic flux 260 is doubled. In various aspects of the present invention, MRB 600 is used in automobile's brake.

Figure 7:
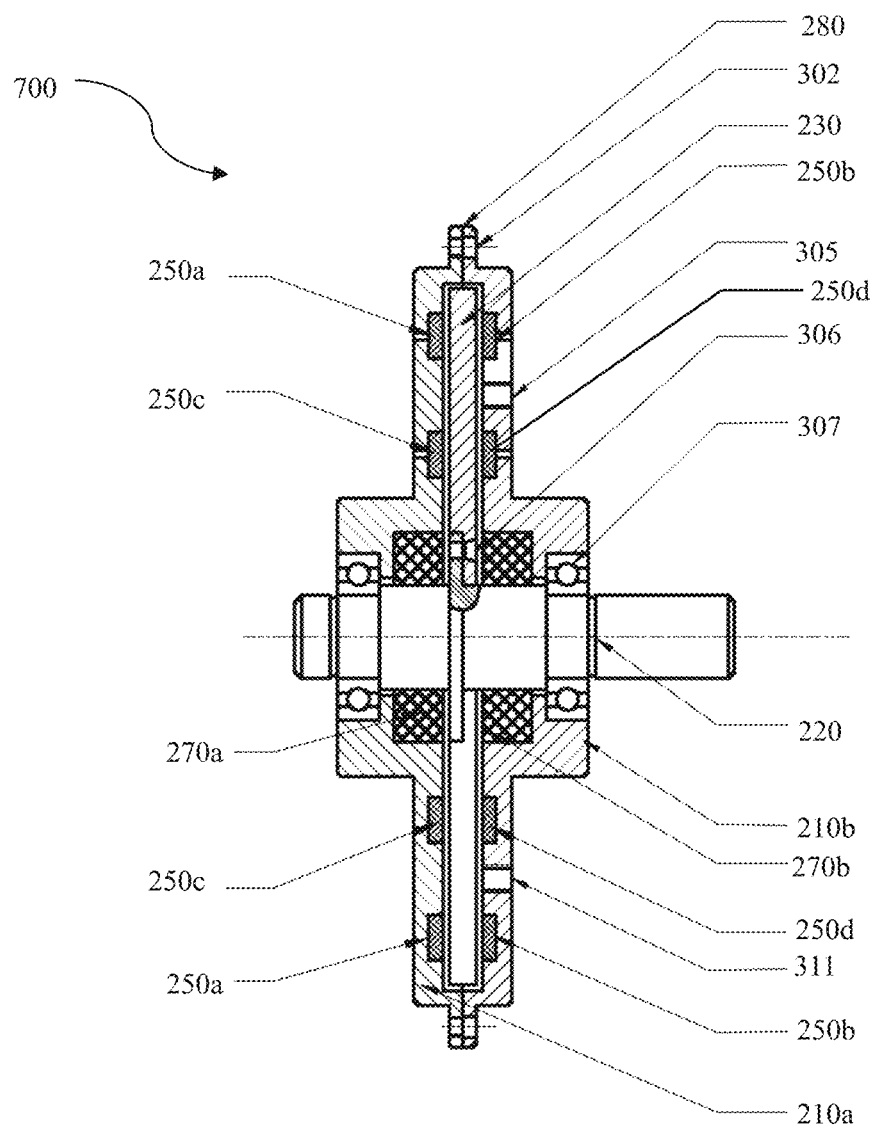
FIG. 7 is a diagram illustrating a planar view of an implementation of the MRB of FIG. 6 in accordance with an embodiment of the present invention.

Next referring to FIG. 7, a more detailed of a practical representation of a polygonal MRB 700 in accordance with an exemplary embodiment of the present invention is illustrated. Please refer to FIG. 6 for more details. Similar to MRB 600, polygonal MRB 700 includes left stationary housing segment 210a and right stationary housing segment 210b are also fastened together by a housing bold 302. Furthermore, second lip seal gasket 280 are applied between left stationary housing segment 210a and right stationary housing segment 210b. On the side of stationary housing 210a-210b, there are filling holes 305 where the magneto-rheological fluid is injected into chamber 240 that contains a magneto-rheological fluid. Filling screws 311 are used to close up filling holes 305. Rotatable shaft 220 is fastened to stationary housing 210 by bearings 307.

The Experiment Test Set-Up

Figure 8:
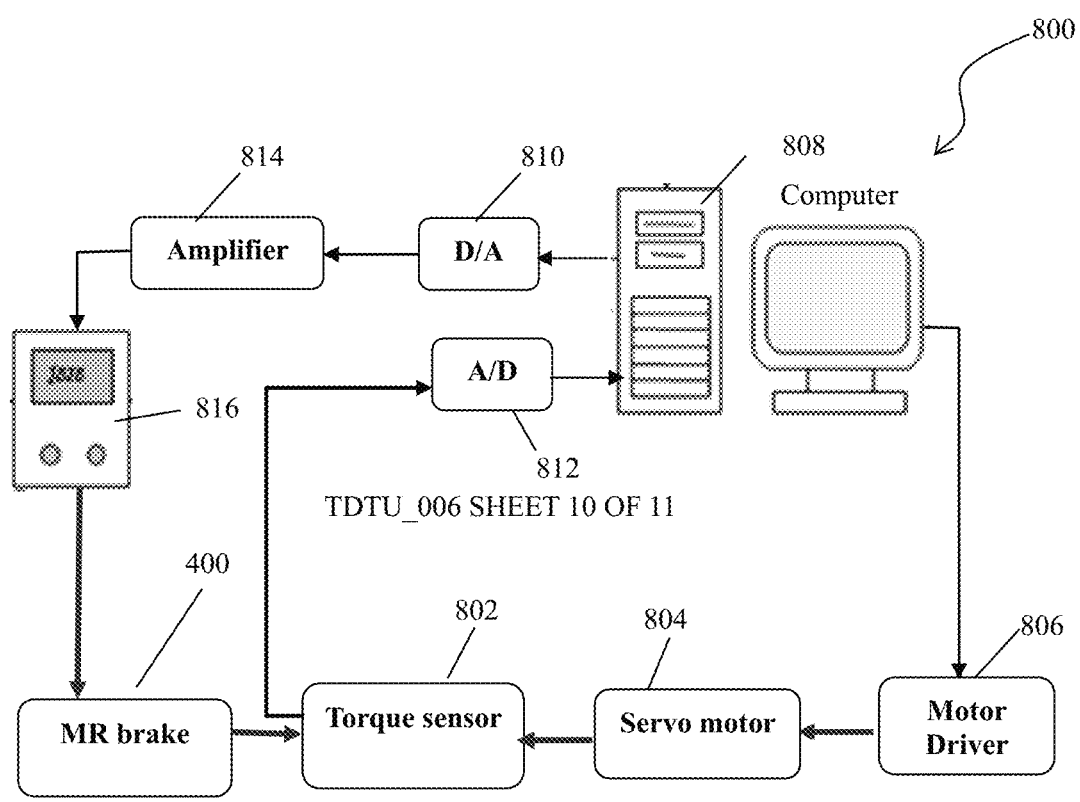
FIG. 8 is a diagram illustrating the test setup for testing the performance of the magneto-rheological brakes in accordance with an embodiment of the present invention.

Now referring to FIG. 8 which illustrates a test setup 800 to obtain the performances of MRB 200-MRB 700 in accordance with an embodiment of the present invention. In FIG. 8, disc-type MRB 400 is used; however, it is noted that other embodiments such as MRB 500 to MRB 700 can be used. In test set up 800, a DC servo motor 806 with a gear-box 804 is controlled by a computer 808. DC servo motor 806 is used to rotate shaft 230 of MRB 400 at a constant angular speed of 4π rad/s. The torque generated by MRB 400 is measured by a torque sensor 802. The output signal from torque sensor 802 is then sent to computer 808 via the A/D converter 812 for evaluation. Once the experiment process is established, a step current signal from computer 808 is sent to a current amplifier 814 via a D/A converter 810. The output current from current amplifier 814, a step current of 2.5 A, is applied to coil first magnetic coil 250a and second magnetic coil 250b of MRB 200-MRB 400.

The Experiment Results

Figure 1A:
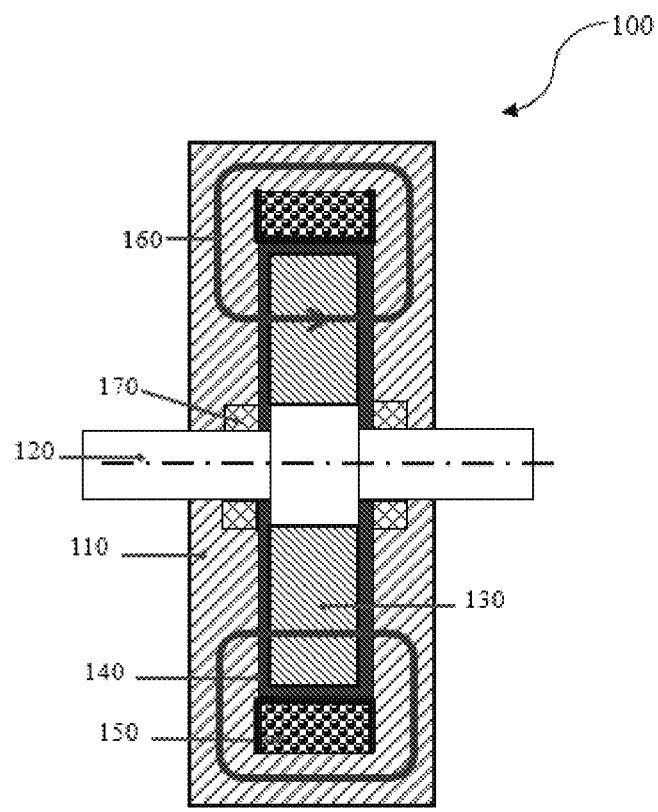
FIG. 1A is a diagram illustrating a planar view of a prior-art magneto-rheological brake (MRB) having a magnetic coil located on top and bottom of the stationary housing respectively.
Figure 1B:
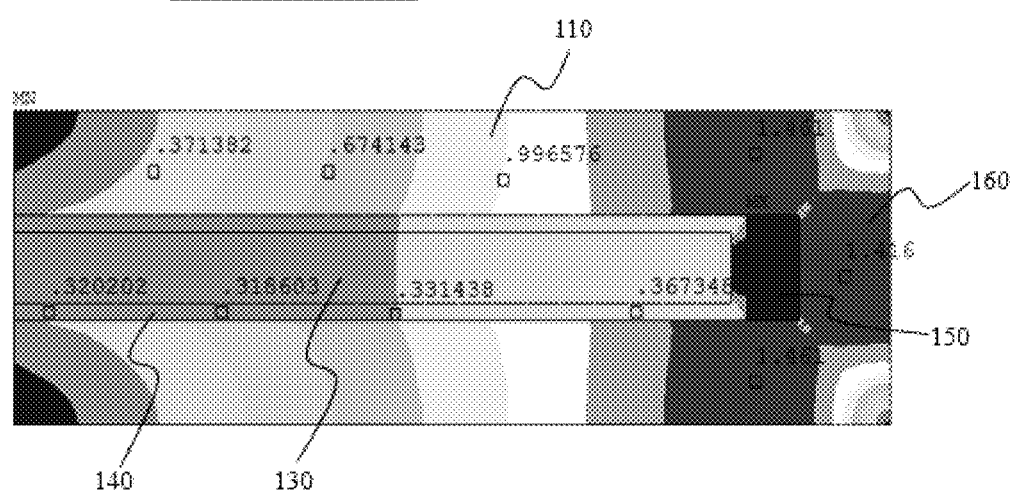
FIG. 1B shows magnetic distributions of the prior-art magneto-rheological brake.
Figure 9A:
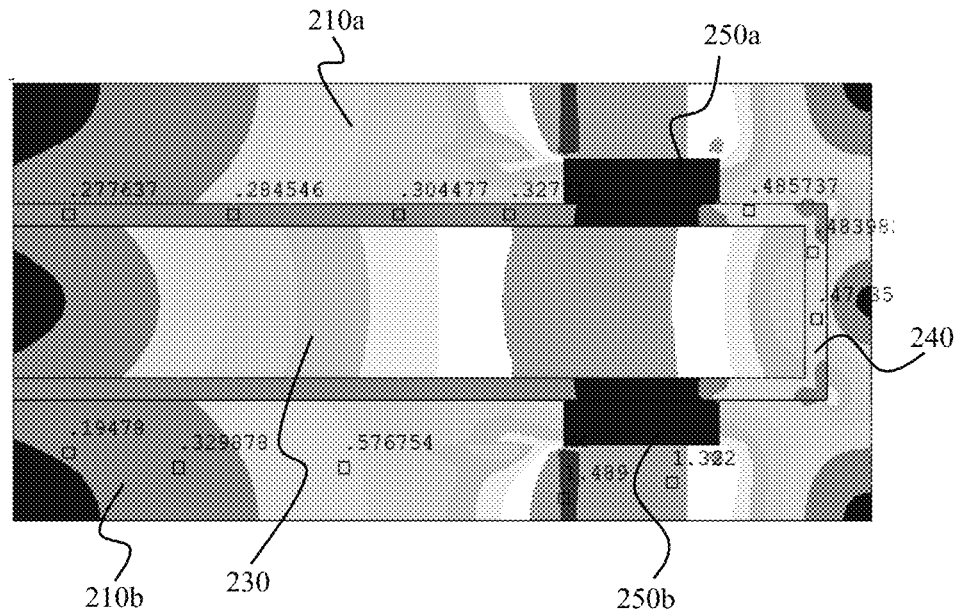
FIG. 9A shows the magnetic flux distribution of the disc-type magneto-rheological brake (MRB) in accordance with an embodiment of the present invention.
Figure 9B:
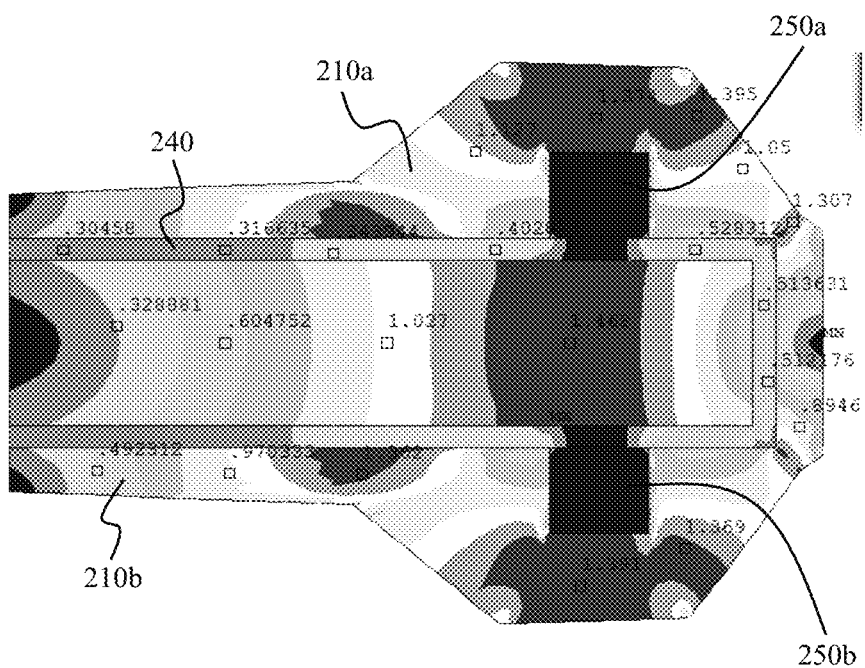
FIG. 9B shows the magnetic flux distribution of the polygonal shaped (heptagon) magneto-rheological brake (MRB) in accordance with an embodiment of the present invention.

Now referring to FIG. 9A-FIG. 9B. FIG. 9A-FIG. 9B illustrate the test results showing the comparisons of magnetic distributions of MRB 200 versus MRB 400. FIG. 1B shows the magnetic distribution of the prior-art rectangular MRB 100. As shown in FIG. 1B, the magnetic distribution in stationary housing 110 is very non-uniform. The magnetic density near magnetic coil 150 almost reaches to the magnetic saturation of the housing material (1.146) while that near rotatable shaft 130 is very small (0.32 to 0.36). This will cause inefficient braking. The magnetic distribution of MRB 200 with numerical values of magnetic density at significant points is illustrated in FIG. 9A. The braking torque of the MRB 400 reaches up to 10 Nm as and the minimum mass is 1.08 kg and the values of design variables in millimeters (mm) are: $w_c$=6.9, $h_c$=2.5, $t_d$=4, $R_d$=44, $R_1$=10.5, $t_{h1}$=2, $R_2$=24.4, $t_{h2}$=2.4, $R_3$=34, $t_{h3}$=3.8, $R_4$=49.5, $t_{h4}$=5.8, $R_5$=52.4, $t_{h5}$=5.85, $R_6$=55.8, $t_{h6}$=4.25, $R(R_7)$=57.6, $t_{h7}$=2. FIG. 9B illustrates the magnetic distribution of MRB 400 with numerical values of magnetic density displayed at significant points. The braking torque of MRB 400 is 10 Nm and the minimum mass is 0.96 kg. Preferably, the values of MRB 400 in millimeters (mm) are: $w_c$=3.8, $h_c$=4.3, $t_d$=7.5, $R_d$=44.5, $R_c$=36, $R_1$=13, $t_{h1}$=2, $R_2$=27.5, $t_{h2}$=2.6, $R_3$=34, $t_{h3}$=8, $R_4$=42, $t_{h4}$=7.7, $R_5$=43.5, $t_{h5}$=5.8, $R_6$=46.6, $t_{h6}$=1.1, $R(R_7)$=47.6, $t_{h7}$=0.3. The mass of MRB 400 with 7-control point polygonal envelope is significantly reduced as compared to that of MRB 200.

A Practical Disc-Type MRB of the Present Invention

Figure 10:
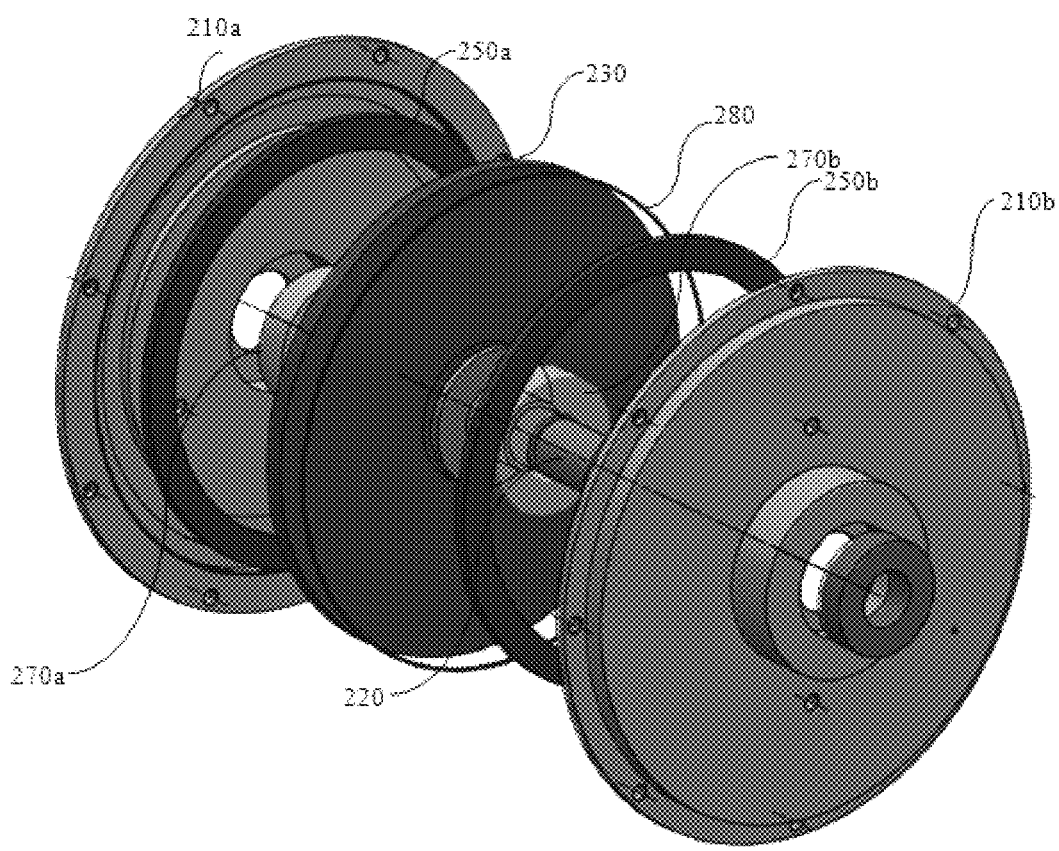
FIG. 10 shows all component parts of a MRB taken apart to show a first magnetic coil and a second magnetic coil wound directly onto the lateral sides of the stationary housing in accordance with an embodiment of the present invention.

Refer now to FIG. 10, an exemplary embodiment of disc type MRB 200 as described in FIG. 2 with constituent components taken apart is illustrated. MRB 200 includes the following components: second lip seal gasket 280, left housing segment 210a with first magnetic coil 250a, right housing segment 210b with second magnetic coil 250b, rotor 230, rotatable shaft 220, and sealants 270a and 270b as discussed above are shown.

Figure 11:
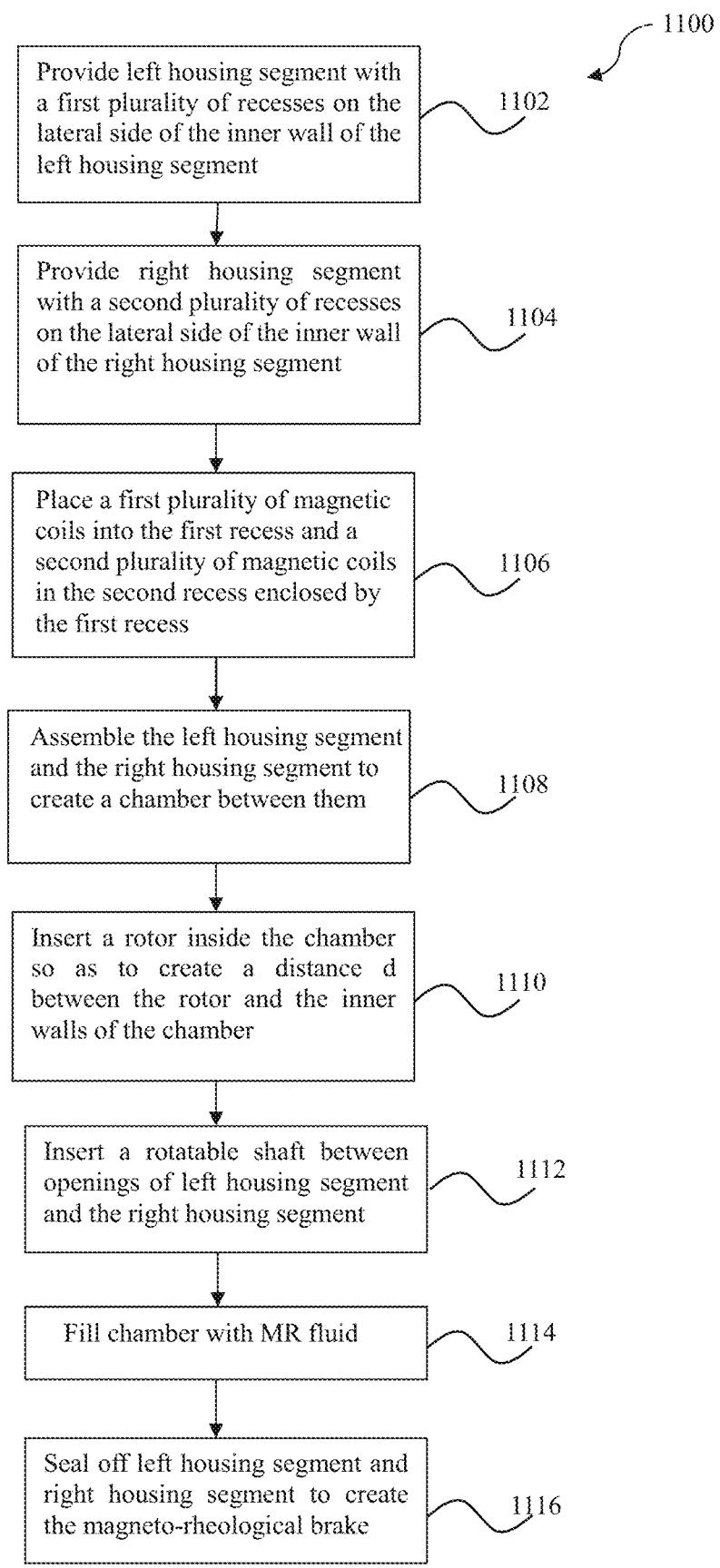
FIG. 11 is a flow chart illustrating a process of manufacturing a magneto-rheological brakes in accordance with an embodiment of the present invention.

Referring next to FIG. 11, FIG. 11 illustrates a method 1100 for making magneto-rheological brakes 200-700 in accordance with different embodiments of the present invention described in FIG. 2, FIG. 3, and FIG. 4 above. Generally, method 800 describes steps for making a magneto-rheological brake having a plurality of magnetic coils wound in different locations on a single lateral side of a magneto-rheological chamber.

At step 1102, a left housing segment having a first recess carved out on the lateral side of the inner wall of the left housing segment is provided. In addition, left housing segment also has an opening located at the center where a rotatable shaft is inserted. The first recess has a height $h_c$ and a width $w_c$. In an embodiment of the present invention, step 1102 is realized by left housing segment 210a. As described in FIG. 2-FIG. 5, left housing 210a has a first recess where first magnetic coil 250a is located and an opening where rotatable shaft 220 is inserted. In FIG. 7-FIG. 8 embodiments where a plurality of magnetic coils are employed, step 1102 is realized by winding a first magnetic coil 250a and third magnetic coil 250c on left housing segment 210a on left housing segment 210b as shown in FIG. 6.

Next at step 1104, a right housing segment having a second recess carved out on the lateral side of the inner wall of the right housing segment is provided. In addition, right housing segment also has an opening located at the center where a rotatable shaft is inserted. The second recess has a height $h_c$ and a width $w_c$. In an embodiment of the present invention, step 1104 is realized by right housing segment 210b. As described in FIG. 2-FIG. 5, right housing 210b has a first recess where second magnetic coil 250b is located. The openings of left housing segment 210a and the right housing segment 210b are aligned so that rotatable shaft 220 is inserted through them. In FIG. 7-FIG. 8 illustrate embodiments where a plurality of magnetic coils are employed, step 1104 is realized by winding a second magnetic coil 250b and fourth magnetic coil 250d on right housing segment 210b as shown in FIG. 6.

At step 1106, a step of placing a first magnetic coil onto the first recess area and a second magnetic coil onto the second recess area is provided. More particularly, the first magnetic coil and the second magnetic coil are positioned in the outer periphery of the lateral walls of the left housing segment and the right housing segment respectively. In the present invention, step 1106 is performed by first magnetic coil 250a and second magnetic coil 250b. As shown in FIG. 2-FIG. 5 above, first magnetic coil 250a and second magnetic coil 250b are located at the periphery of the lateral walls of left housing segment 210a and right housing segment 210b respectively. In the plurality of magnetic coils embodiment illustrated in FIG. 6-FIG. 7, first magnetic coil 250a, second magnetic coil 250b, third magnetic coil 250c, and fourth magnetic coil 250d are wound on left housing segment 210a and right housing segment 210b respectively as shown. After step 1106 is performed, the first magnetic coil and the second magnetic coil do not necessitate a bobbin as required in the prior art. Furthermore, as shown in FIG. 9A and FIG. 9B, the magnetic fluxes 260 are more evenly distributed, causing the MR fluid in chamber 240 to change its phase more uniformly.

Next at step 1108, a step of assembling left housing segment and the right housing segment using a sealant is provided. More particularly, the left housing segment and the right housing segment are configured so that they create an inner chamber when assembled together. In one embodiment of the present invention, step 1108 is realized by chamber 240.

Next is step 1110, a rotor is provided inside the chamber such that a distance d is created between the outer wall of the rotor and the first and second magnetic coil. In the present invention, step 1110 is realized by rotor 230. In one embodiment, rotor 230 has a width $t_d$ and a length $R_d$.

Now referring next to step 1112, a rotatable shaft is interconnected to the rotor so that the rotatable shaft and the rotor can rotate together. In the present invention, step 1112 is realized by rotatable shaft 220. Rotatable shaft 220 is inserted through the openings of left housing segment 210a and right housing segment 210b. Rotatable shaft has a radius $R_I$ within rotor 230 and radius $R_s$ outside of rotor 230.

Next is step 1114, a magneto-rheological fluid is injected into the chamber. In effect, the magneto-rheological fluid is filled in the gap d between the rotor and the inner walls of the left housing segment and the right housing segment. In the present invention, step 1114 is realized by magneto-rheological fluid being injected into chamber 240.

Finally, at step 1116, left housing segment and right housing segment are sealed off. Step 1116 is realized by radial lip seals 270a and 270b. In addition, second lip seal gasket 280 is used to glue left housing segment 210a and right housing segment 210b together. Furthermore, housing bold 302, bearing 307 and filling crews 383 are also used to realize step 1116.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS 100 prior art MRB braking system
110 stationary housing
120 shaft
130 rotor
140 chamber containing MR material
150 magnetic coils
160 magnetic flux
170 sealants
200 disc type MRB of the present invention
210a left stationary housing
210b right stationary housing
220 rotatable shaft
230 rotor
240 MR chamber
250a first magnetic coil
250b second magnetic coil
250c third magnetic coil
250d fourth magnetic coil
260 magnetic flux
270 sealants
280 second lip seal gasket
300 disc type MR brake
302 housing bold
305 filling hole
307 bearing
311 Filling screws
400 top half of seven segmented (heptagon) MRB
500 practical implementation of heptagon MRB
600 top half of multi magnetic coil MRB
700 practical implementation of multi-magnetic coil MRB
800 test se-up for MRBs
802 torque sensor
806 motor
808 computer
810 A/D converter
812 D/A converter
814 amplifier
816 ammeter

What is claimed is:

1. An magneto-rheological brake (MRB), comprising:
   a rotatable shaft;
   a stationary housing having openings where said rotatable shaft goes through;
   a chamber formed inside said stationary housing;
   a rotary disc, positioned inside said chamber, and mechanically interconnected to said rotatable shaft;
   a first magnetic coil and a second magnetic coil wound onto a left lateral wall of said chamber, and a third magnetic coil and a fourth magnetic coil wound onto a right lateral wall of said chamber; and
   a magneto-rheological fluid filled said chamber.

2. The magneto-rheological brake of claim 1 wherein said first magnetic coil and said third magnetic coil are wound directly on a lateral left wall of said chamber and said second magnetic and said fourth magnetic coil wound directly on a right lateral wall of said chamber.

3. The magneto-rheological brake of claim 1 further comprising:
   a controller and current amplifier electrically connected to said first magnetic coil, said second magnetic coil, said third magnetic coil, and said fourth magnetic coil so as to control the currents and the magnetic flux, and the properties of said magneto-rheological fluid.

4. The magneto-rheological brake of claim 1 wherein the resistance of said first magnetic coil and said second magnetic coil is 3 ohms (3Ω) and the number of coil turns is 140 turns.

5. The magneto-rheological brake of claim 1 wherein said stationary housing further comprises a first recess located on said left lateral wall of said chamber and a second recess located on said right lateral wall of said chamber opposite to said first recess; wherein said first magnetic coil is wound inside said first recess and said second magnetic coil is wound inside said second recess.

6. The magneto-rheological brake of claim 1 wherein said stationary housing further comprises a third recess located on said left lateral wall of said chamber and a fourth recess located on said right lateral wall of said chamber opposite to said third recess; wherein said third magnetic coil is wound inside said third recess and said fourth magnetic coil is wound inside said fourth recess.

7. The magneto-rheological brake of claim 1 wherein said stationary housing has a disc shape.

8. The magneto-rheological brake of claim 1 wherein said stationary housing has a rectangular shape.

9. The magneto-rheological brake of claim 1 wherein said stationary housing has a polygonal shape.

10. The magneto-rheological brake of claim 1 wherein said stationary housing further comprises a left segment and a right segment.

11. The magneto-rheological brake of claim 10 wherein said left segment and said right segment are connected together by a first sealant along a vertical axis perpendicular to said rotatable shaft.

12. The magneto-rheological brake of claim 1 wherein said first magnetic coil, said second magnetic coil each has a width of 3.8 mm, a height of 4.5 mm, and a radius of 36 mm.

13. The magneto-rheological brake of claim 1 wherein said rotatable shaft has a radius of 6 mm.

14. The magneto-rheological brake of claim 1 wherein a gap between said rotatable shaft and inner walls of said chamber has a width of 1 mm.

15. The magneto-rheological brake of claim 9 wherein the distance from the center of said rotatable shaft to a first apex of said stationary housing is 13 mm and the distance from said chamber to said first apex is 2 mm, the distance from the center of said rotatable shaft to a second apex is 27.5 mm and the distance from said chamber to said first apex is 2.6 mm, wherein the distance from the center of said rotatable shaft to a third apex is 34 mm and the distance from said chamber to said third apex is 8 mm, the distance from the center of said rotatable shaft to a fourth apex is 42 mm and the distance from said chamber to said fourth apex is 7.7 mm, the distance from the center of said rotatable shaft to a fifth apex is 43.5 mm and the distance from said chamber to said fifth apex is 5.8 mm, the distance from the center of said rotatable shaft to a sixth apex is 46.6 mm and the distance from said chamber to said first apex is 1.1 mm, and wherein the distance from the center of said rotatable shaft to a seventh apex is 47.6 mm and the distance from said chamber to said first apex is 0.3 mm.

16. A method of making a magneto-rheological brake (MRB) comprising:
   (a) providing a rotatable shaft;
   (b) providing a stationary housing having an opening at the center of said stationary housing;
   (c) connecting said stationary housing to said rotatable shaft through said opening;
   (d) providing a magneto-rheological fluid chamber inside said stationary housing;
   (e) providing a rotary disc, positioned inside said magneto-rheological fluid chamber, and connected to said rotatable shaft; and
   (f) winding a first magnetic coil and a second magnetic coil wound onto a left lateral wall of said magneto-rheological fluid chamber, and a third magnetic coil and a fourth magnetic coil wound onto a right lateral wall of said magneto-rheological fluid chamber.

17. The method of claim 16 wherein said step (f) of winding further comprises:
   forming a first recess on said left lateral wall of said magneto-rheological fluid chamber; and
   forming a second recess on said right lateral wall of said magneto-rheological fluid chamber and opposite to said first magnetic coil;
   forming a third recess on said left lateral wall of said magneto-rheological fluid chamber; and
   forming a fourth recess on said right lateral wall of said magneto-rheological fluid chamber and opposite to said first magnetic coil.

18. The method of claim 16 wherein said step (b) of providing a stationary housing further comprises providing a polygonal stationary housing.

19. The method of claim 16 further comprising:
   providing a controller electrically connected to said plurality of magnetic coils so as to control currents, magnetic fluxes, and the properties of said magneto-rheological fluid chamber.

20. The method of claim 17 wherein said step (b) of providing a stationary housing further comprises:
   providing a seven segmented polygonal stationary housing and wherein the distance from the center of said rotatable shaft to a first apex stationary housing is 13 mm and the distance from said magneto-rheological fluid chamber to said first apex is 2 mm, the distance from the center of said rotatable shaft to a second apex stationary housing is 27.5 mm and the distance from said magneto-rheological fluid chamber to said first apex is 2.6 mm, wherein the distance from the center of said rotatable shaft to a third apex of said stationary housing is 34 mm and the distance from said magneto-rheological fluid chamber to said third apex is 8 mm, the distance from the center of said rotatable shaft to a fourth apex of said stationary housing is 42 mm and the distance from said magneto-rheological fluid chamber to said fourth apex is 7.7 mm, the distance from the center of said rotatable shaft to a fifth apex of said stationary housing is 43.5 mm and the distance from said magneto-rheological fluid chamber to said fifth apex is 5.8 mm, the distance from the center of said rotatable shaft to a sixth apex of said stationary chamber is 46.6 mm and the distance from said magneto-rheological fluid chamber to said first apex is 1.1 mm, and wherein the distance from the center of said rotatable shaft to a seventh apex of said stationary chamber is 47.6 mm and the distance from said magneto-rheological fluid chamber to said first apex is 0.3 mm.

* * * * *